No. 791,423. PATENTED MAY 30, 1905.
J. D. IHLDER.
ALTERNATING CURRENT ELECTROMAGNET.
APPLICATION FILED DEC. 2, 1904.
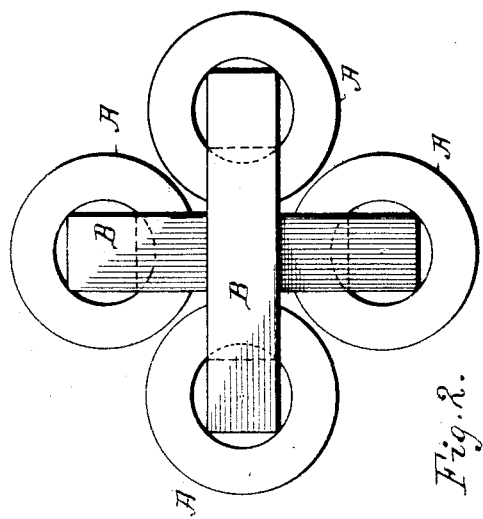
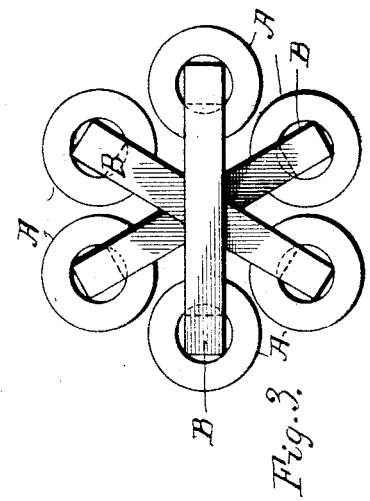
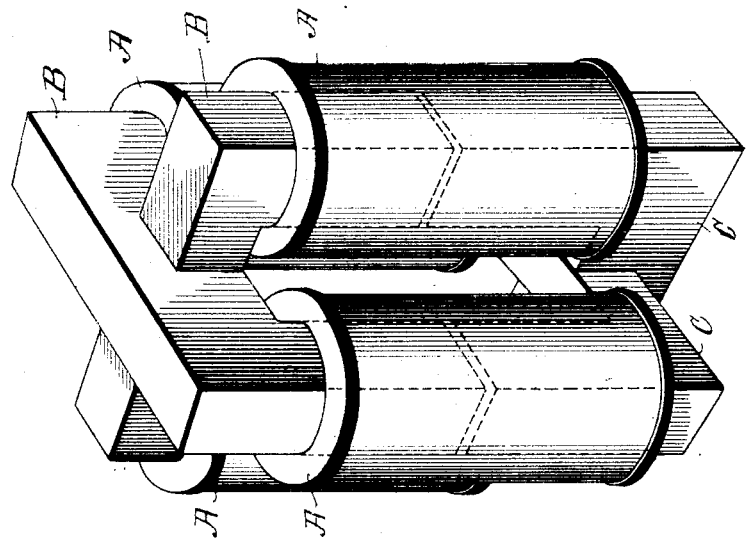

No. 791,423.

Patented May 30, 1905.

UNITED STATES PATENT OFFICE.

JOHN D. IHLDER, OF NEW YORK, N. Y., ASSIGNOR TO OTIS ELEVATOR COMPANY, OF EAST ORANGE, NEW JERSEY, A CORPORATION OF NEW JERSEY.

ALTERNATING-CURRENT ELECTROMAGNET.

SPECIFICATION forming part of Letters Patent No. 791,423, dated May 30, 1905.

Original application filed July 31, 1903, Serial No. 167,768. Divided and this application filed December 2, 1904. Serial No. 235,246.

*To all whom it may concern:*

Be it known that I, JOHN D. IHLDER, of the city, county, and State of New York, have invented a new and useful Improvement in Alternating-Current Electromagnets, of which the following is a specification.

The invention relates to polyphase-current electromagnets, and more particularly to the construction thereof whereby the electromagnet is caused to exercise its tractive effect without the production of chattering or like noises.

The invention consists in a polyphase-current tractive electromagnet having an armature, means for electromagnetically attracting said armature at two points, and means for electromagnetically opposing the movement of said armature around an axis joining said points; also, means for producing a rotary field of force and an armature supported in inductive proximity to said field and movable thereby in the direction of the axis of rotation of said field; also, in the construction of the magnet, as hereinafter set forth, whereby a plurality of more than two coils are caused to exert their tractive effect upon a single armature supported in inductive proximity to all of them; also, in the combination, in such a magnet, of a laminated core having a plurality of parallel pole-pieces extending from one side thereof and coils on said pole-pieces, and also in the various other combinations set out in the claims.

This application is a division of my pending application for improvement in electric controlling apparatus, Serial No. 167,768, filed July 31, 1903, in which apparatus my hereinafter-described magnet is also embodied.

I do not claim herein the combination, with an electrical machine to be controlled, of controlling-switches and apparatus therefor, alternating-current magnets having a plurality of windings arranged to operate said switches, and apparatus and means for supplying alternating current of different phases to each winding of said magnets, since the foregoing is fully claimed in my said pending application.

In the accompanying drawings, Figure 1 is a perspective side elevation of an alternating-current magnet embodying this invention. Fig. 2 is a plan view of the same. Fig. 3 is a plan view of a modified form of magnet.

Referring to the drawings, in Fig. 1 an alteanating-current magnet is shown, a plurality of coils A, and cores B. The cores in this instance are shown U-shaped, although they may be made of any suitable construction. When alternating currents are used in magnets according to the usual construction, the magnetism rises and falls and causes the armature of the magnet to fall away from the core periodically, and thus keep up a constant chattering. By using two or more phases of a multiphase current in the different windings of a magnet the magnetism in one winding may always be kept at a maximum, while that in the others is dying down, and this construction always affords a strong field to attract the armature of the magnet.

In the construction of magnet shown in Figs. 1 and 2 one phase of an alternating current may be sent through two of the windings on one of the U-shaped cores B, while another phase is sent through the other two windings on the other U-shaped core B. The armatures C are also shown U-shaped and extending into the windings A. According to this construction the magnetism will be maximum in the windings of one core B while it is dying away in the windings of the other core, and thus strong magnetism is always present for holding the armature C. Moreover, according to the construction of magnet shown the armature C is attracted at each end, and thus strongly held tightly against the core B. One phase will always be at a maximum, and therefore strong magnetism will always be present in one pair of the windings for holding the armature against the core, and thus preventing chattering. Fig. 3 shows the arrangement used with a three-phase current.

I am aware of the construction of polyphase-current electromagnet set forth in United States Patent to Tingley, No. 633,969, dated September 26, 1899. In the magnet there illustrated the coils are disposed in tandem with their centers in line and each coil acts upon its own armature. While the magnetic effect increases in one coil and while it also decreases in the other, the point of application of the force on the armatures is always the same. In my present magnet, on the other hand, the coils are not disposed in tandem, but in parallel—that is, with their axes disposed around a circumference—and they all act on one and the same armature. Here, unlike the tandem arrangement, the magnetic pull is not exerted on the same point of the armature, but on different points. Thus coils A A, for example, exert an increasing pull, while coils B B exert a decreasing pull; but the line joining the centers of B B is at an angle to that joining the centers of A A. If the pull were exerted only at A A or B B, then the armature would be free to oscillate on a transverse axis coincident with the line forming the centers of coils A A or B B, and as very small range of movement is sufficient to produce the objectionable chattering noise this would easily occur; but the magnetism of the other coils, decreasing, it is true, but still present, now serves to dampen and stop that oscillation, because exerted upon the armature on each side of its axis of oscillation. Hence in my device, as specifically shown in Figs. 1 and 2, one pair of coils is exerting the main attractive power while the other pair of coils is exerting less attractive power, but sufficient to prevent any movement of the armature about its transverse axis of oscillation. In Fig. 3 this is even more evident, for here while one pair of coils is at a maximum pull and another pair is at minimum pull there is a third pair always at intermediate pull and each pair acts at different points on the single armature. Moreover, and especially in Fig. 3, it is evident that where the diametrically opposite coils of the pairs arranged as shown are successively brought to maximum pull a rotary field results—rotary around the point of intersection of the cores—and this field acts on the armature not to rotate, but to attract that armature in the direction of the axis of rotation. As Fig. 1 also shows, the armature is guided so as to move only in this path.

I claim—

1. In a polyphase-current tractive electromagnet, an armature, means for electromagnetically attracting said armature at two points, and means for electromagnetically opposing the movement of said armature about an axis joining said points.

2. In a polyphase-current tractive electromagnet, an armature, means for exerting a varying attractive force on two points of said armature, and means for exerting an attractive force inversely varying as compared with said first-named attractive force on a third point of said armature exterior to a right line passing through said first-named points.

3. In a polyphase-current tractive electromagnet a plurality of more than two coils having parallel longitudinal axes, one of said coils being disposed at one side of a line extending between the axes of two of the other coils.

4. In a polyphase-current tractive electromagnet, two pairs of coils having parallel longitudinal axes, the coils of one pair being respectively disposed at opposite sides of a line extending between the axes of the other pair of coils.

5. Means for producing a rotary field of force and an armature supported in inductive proximity to said field and movable thereby in the direction of the axis of rotation of said field.

6. Means for producing a rotary field of force, a movable armature in inductive proximity thereto and supported with its axis in prolongation of the axis of rotation of said field, and means for guiding said armature to move in a right line coincident with said axes.

7. In a polyphase-current tractive electromagnet, a plurality of more than two eccentrically-disposed coils having parallel longitudinal axes.

8. In a polyphase-current tractive electromagnet a plurality of more than two eccentrically-disposed coils and an armature supported in inductive proximity to said coils.

9. In a polyphase-current electromagnet, a plurality of more than two coils and a single armature supported in inductive proximity to all of said coils.

10. In a polyphase-current tractive electromagnet, a support and a plurality of more than two coils having their longitudinal axes parallel and extending from one side of said support.

11. In a polyphase-current tractive electromagnet, a support and a plurality of more than two coils having their longitudinal axes parallel and extending from one side of said support and circumferentially disposed around a point on said side.

12. In a polyphase-current tractive electromagnet, a support and a plurality of more than two coils having their longitudinal axes parallel and extending from one side of said support and equidistantly disposed around a circumference struck from a point on said side.

13. In a polyphase-current tractive electromagnet, a support, a plurality of more than two coils having their longitudinal axes parallel and extending from one side of said support and an armature supported in inductive proximity to said coils.

14. In a polyphase-current tractive electromagnet, a laminated core having a plurality of more than two parallel pole-pieces extending from one side thereof and coils on said pole-pieces.

15. In a polyphase-current tractive electromagnet, a support, a plurality of coils connected in pairs and having their axes parallel, the coils of each pair being diametrically and oppositely disposed around a circumference struck from a center on one side of said support and the successive coils being equidistantly spaced around said circumference.

In testimony whereof I have signed my name to this specification in the presence of two subscribing witnesses.

JOHN D. IHLDER.

Witnesses:
  WM. H. SIEGMAN,
  I. A. VAN WART.